United States Patent [19]
Stambera

[11] 3,756,084
[45] Sept. 4, 1973

[54] FORCE MEASURING DEVICE FOR SWIMMING IMPLEMENT

[76] Inventor: Adolf Stambera, Dinkelsbuhlstrasse 11, Stuttgart 50, Germany

[22] Filed: Mar. 23, 1971

[21] Appl. No.: 127,195

[30] Foreign Application Priority Data
Mar. 26, 1970 Germany................. P 20 14 670.7

[52] U.S. Cl. .................................................. 73/379
[51] Int. Cl. ................................................ G01l 5/02
[58] Field of Search ......................................... 73/379

[56] References Cited
UNITED STATES PATENTS

| | | |
|---|---|---|
| 2,680,967 | 6/1954 | Newman ............................. 73/379 |
| 2,825,224 | 3/1958 | Lindenauer et al .............. 73/380 X |
| 482,623 | 9/1892 | Dooling ............................... 73/379 |
| 3,512,416 | 5/1970 | Hohwart .............................. 73/379 |

*Primary Examiner*—Richard C. Queisser
*Assistant Examiner*—Arthur E. Korkosz
*Attorney*—Edward E. Sachs

[57] ABSTRACT

A visual force measuring device for use in conjunction with a swimming implement for holding a swimmer while exercising in the water. The device has a pretensioned bellows connected to a fluid conduit and to a rope train, or the like. When the rope train is moved by the swimmer, force registers in the bellows by displacing liquid therein which in turn changes the fluid level in the conduit. A marker set against a measuring rod floats on the fluid surface.

7 Claims, 4 Drawing Figures

Patented Sept. 4, 1973

Inventor:
ADOLF STAMBERA

Edward G. Sachs
ATTORNEY

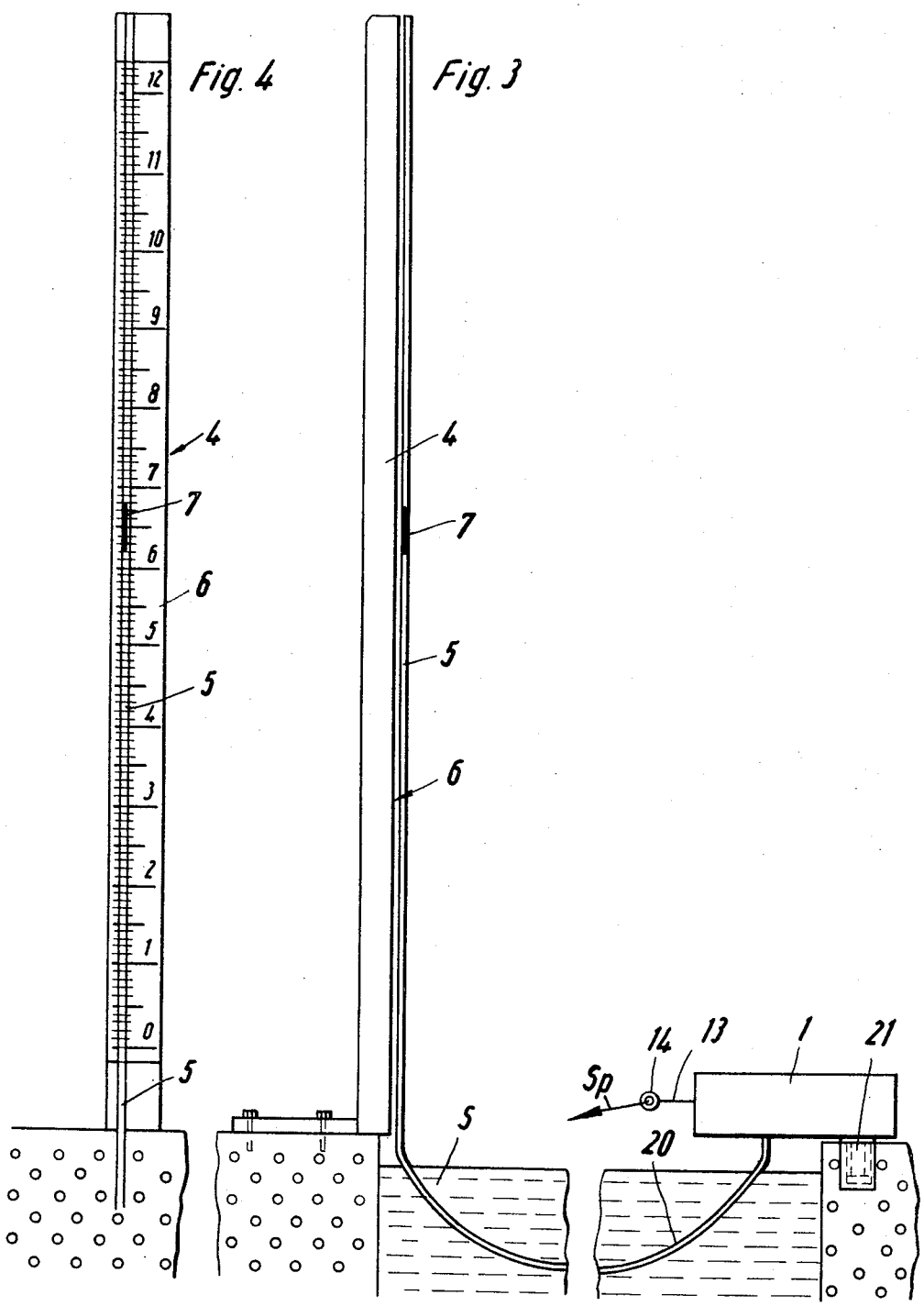

FORCE MEASURING DEVICE FOR SWIMMING IMPLEMENT

The invention relates generally to swimming implements and, more particularly, to a device to measure the force exerted by the swimmer using such implement.

In the prior art, swimming implements are already known in which the swimmer is suspended from a rope train flexibly anchored at the water's edge or some relatively stationary body. The device reacts against the forward motion of the swimmer. The implements have the advantage that the swimmer can exercise in one spot without requiring a big pool or other large body of water.

Such implements are not only used for sports but also are utilized for training of swimmers and for motion therapy. When employed for therapy or training, it is quite important to measure the force exerted by the swimmer in order to make comparisons and to time the swim exercises.

It is the primary object of the present invention to provide an economic measuring device which can be readily connected to the swimming implement and can also be read by the swimmer so that the latter can exercise by himself in accordance with prescribed requirements.

An aspect of the present invention resides in the provision of a device for measuring the force exerted by a swimmer in water using a swimming implement to maintain the swimmer's position in essentially the same spot. The device includes a bellows arranged in such a manner so that it has a movable and a fixed position and is adapted for receiving fluid. Suitably supported springs are attached to the bellows to pre-tension the corrugated bellows. An externally extending fluid conduit is arranged in a manner to connect to the fluid within the bellows. A force indicator is provided which can be read to indicate the level of the fluid in the conduit. A force transmitting link means attaches to the movable end of the bellows for displacing fluid from the bellows into the conduit in response and proportionately in relation to the movement of the link.

For a better understanding of the present invention, together with other and further objects thereof, reference is had to the following description taken in connection with the accompanying drawings, and its scope will be pointed out in the appended claims.

In the drawings:

FIG 3 is a diagrammatic view of the device shown in FIG. 1 and an elevational side view of the measuring device as a whole; and FIG. 4 is an elevational front view of the force indicator.

Figures 1, 2:
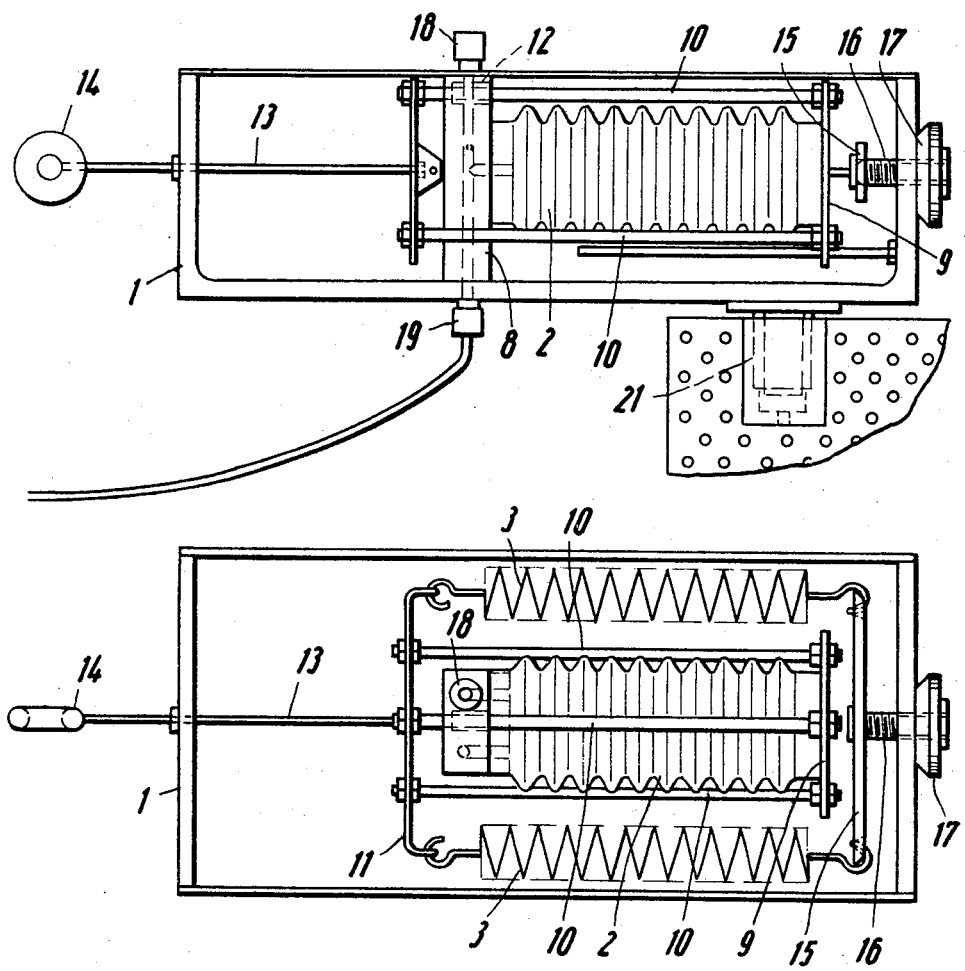
FIG. 1 is a side view of the force measuring device in accordance with this invention without the force indicator.
FIG 2 is a plan view of the device shown in FIG 1.

Referring now to the drawings, there is shown a housing or frame 1 supporting a rubber or rubber-like bellows 2 and two tension springs 3 connected at one end to an anchor plate 11 supporting the bellows. At the other end the springs 3 are adjustably anchored (indirectly) on housing 1. The bellows 2 is disposed in fluid pressure relation with a force indicator 4 having a translucent lift tube 5 placed on a scale 6. A colored buoyant marker 7 is provided in the tube 6.

The bellows 2 is attached at one end to a cross member 8 secured to housing 1 and at the other free end is provided with a pressure plate 9 which closes the bellows thereat. The framework holding the bellows also includes three tension rods 10 extending parallel to the bellows and secured at one end to the plate 9 and at the opposite end connected to an anchoring plate 11. One of the tension rods 10 extends through an aperture 12 in cross-member 8 and serves to guide the movement of bellows 2. As already noted, the tension springs 3, which also extend parallel to the bellows, engage the anchor plate 11 by means of a hook and eyelet provision. A rope train 13 extending and acting in a direction opposite to the spring action is secured substantially at the center of the anchor plate 11. The rope train 13 has an eyelet 14 which can be hooked into a rope Sp (or any similar link) of a swimming implement.

Two of the springs 3 are connected at the rear end to a cross-bar 15 by means of a screw 16 and a counter-nut 17 so that the position of the bar 15 is adjustable relative to the housing 1.

The cross-member 8 connected to bellows 2 has a centrally extending passageway and an extension leading into the bellows, and at the opposite end of the passageway there is provided a nipple 18, 19, with the nipple 19 serving to connect the cross-member to a connecting hose or tube 20 and the nipple 18 being used to receive a fluid which can be placed under pressure in bellows 2 and tube 20; water is usually used for this purpose.

The connecting tube 20 leads to the lift tube 5 of force indicator 4 which can be placed on a relatively stable body, e.g. the edge of a swimming pool S.

As a result of the movement of the swimmer, suspended from or anchored to rope Sp, tension is established causing the bellows 2 to contract against the oppositely acting tension springs 3. The fluid within the bellows 2 becomes thereby partly displaced and causes fluid to flow through tube 20 and in the lift tube 5 whereby the fluid level and the position of marker 7 within tube 5 is altered. The dial 6, provided with a suitable read out graduation, then indicates quite readily the force generated by the swimmer.

The housing or frame 1 containing the bellows arrangement, and the force indicator 4 may be placed, for instance by a pin 21, into the ground adjacent to the edge of the swimming pool S or may be permanently secured thereat by means of other conventional attaching means.

In place of the vertical dial 6, a conventional fluid pressure responsive read out instrument having a circular dial provided with an arm (not shown) may also be used, in which case the indicator 4 is again connected to the tube 20.

The adjustment of the force measuring instrument to zero value is accomplished by changing the stationary position of cross bar 15 by forcing the screw 16 further rearward and thereafter tightening the nut 17. This affects the level of pre-tension in the springs 3 and the raising or loweringof the water level in the lift tube 5.

The device in accordance with this invention can also be utilized in conjunction with a clock relating the graduation of the dial 6 and the movement of marker 7 to the comparable distance that the swimmer would have swam in free style during a certain time period. T distance may, of course, also be immediately determined by a suitable switch/combination of the measuring device and a timer.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A visual strength measuring device for swimming exercises which can be continually viewed by the swimmer while such execise takes place, comprising:

fluid responsive strength measuring means effective to displace fluid in correlation to a manual force input; a link connectible to said measuring means and adaptable for securing to a swimmer whose exercise is to be measured;

a fluid level indicator having a flexible fluid conduit operatively connectible to said measuring means for receiving the displaced fluid, said indicator adapted to be positioned at a location remote from but within sight of said measuring means and at locations selectively either forward, rearward, or to the side of said measuring means to permit the swimmer while swimming to visually ascertain the extent of his exercises;

wherein said force measuring means includes a fluid sealed bellows; frame means mounting said bellows for expansion and contraction; tension spring means connecting to said frame means and acting in opposition to the movement of said bellows; conduit connecting means establishing a sealed fluid passageway to and between said bellows and said fluid conduit;

and wherein said frame means includes a forward and rearward bracket with said spring means interposed between said brackets and extending substantially alongside said bellows.

2. A device according to claim 1, wherein said indicator comprises a dial and a lift tube mounted along and adjacent to said dial; said lift tube being connected to said fluid conduit.

3. A device according to claim 1, wherein said lift tube is translucent, and a buoyant marker in said tube.

4. A device according to claim 1, and a pin on said force measuring means and on said indicator for mounting each thereof onto a stationary body.

5. Device for measuring the force exerted by a swimmer according to claim 1, wherein said indicator comprises a self-contained fluid pressure responsive read out instrument having a graduated dial and being connected to said fluid conduit.

6. A device according to claim 1, and spring tension adjustment means movably secured between two portions of said frame means effective to adjust the distance between said portions to affect the tension of the spring means.

7. A device according to claim 1, wherein said link connects to said frame means.

* * * * *